United States Patent [19]

Ghent

[11] 4,061,308
[45] Dec. 6, 1977

[54] SPRING MANIPULATING DEVICE

[76] Inventor: Roy B. Ghent, R.R. 1 Longacre, Marietta, Ohio 45750

[21] Appl. No.: 755,856

[22] Filed: Dec. 30, 1976

[51] Int. Cl.² .......................................... B23P 19/04
[52] U.S. Cl. ..................................... 254/10.5; 29/227
[58] Field of Search ................. 254/10.5; 29/215–218, 29/225–227

[56] References Cited

U.S. PATENT DOCUMENTS 2,883,742  4/1959  Prath ................................... 254/10.5

Primary Examiner—James L. Jones, Jr.
Assistant Examiner—Robert C. Watson
Attorney, Agent, or Firm—D. Paul Weaver

[57] ABSTRACT

A unitized spring manipulating device employs spaced relatively movable spring coil engaging frames of channel cross section which surround the coil spring on three sides. Hinged safety retainer bars on the frames close their normally open sides during usage of the device. Internal spacer bars adapt the frames to springs of varying size. The coil engaging frames are connected through a jacking device which produces relative movement between the frames to compress the spring preparatory to removing a shock absorber strut which the spring surrounds or for other purposes.

7 Claims, 6 Drawing Figures

U.S. Patent    Dec. 6, 1977    4,061,308
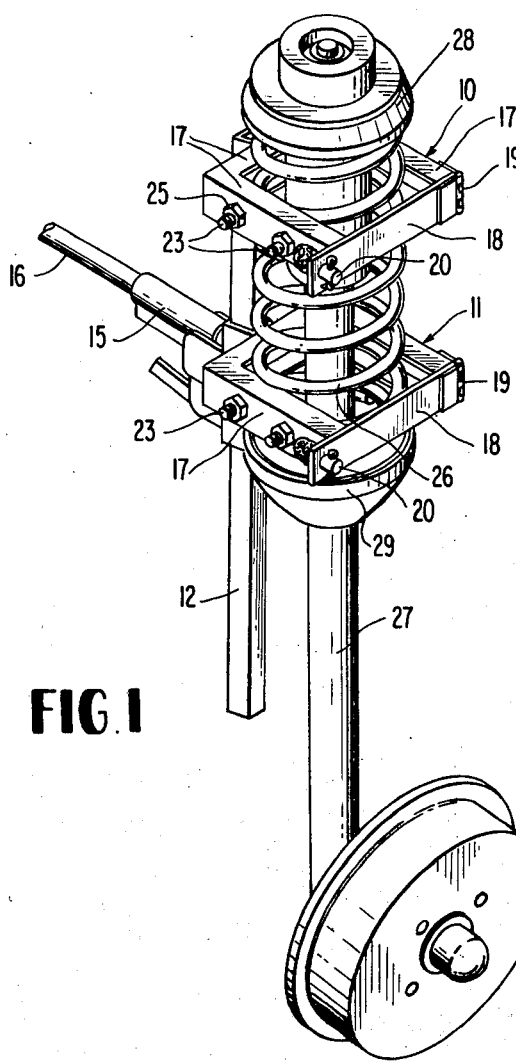
FIG.1
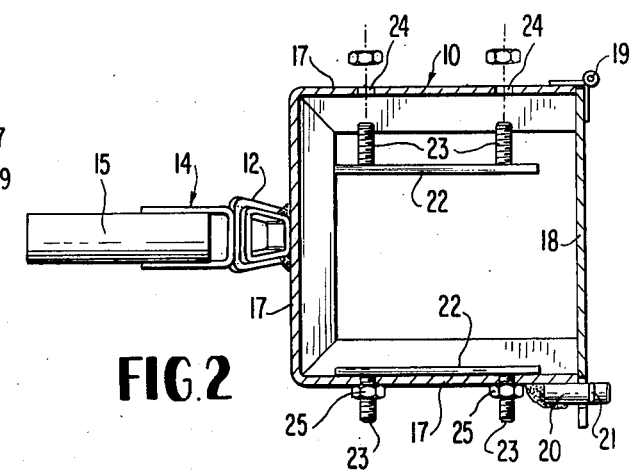
FIG.2
FIG.3
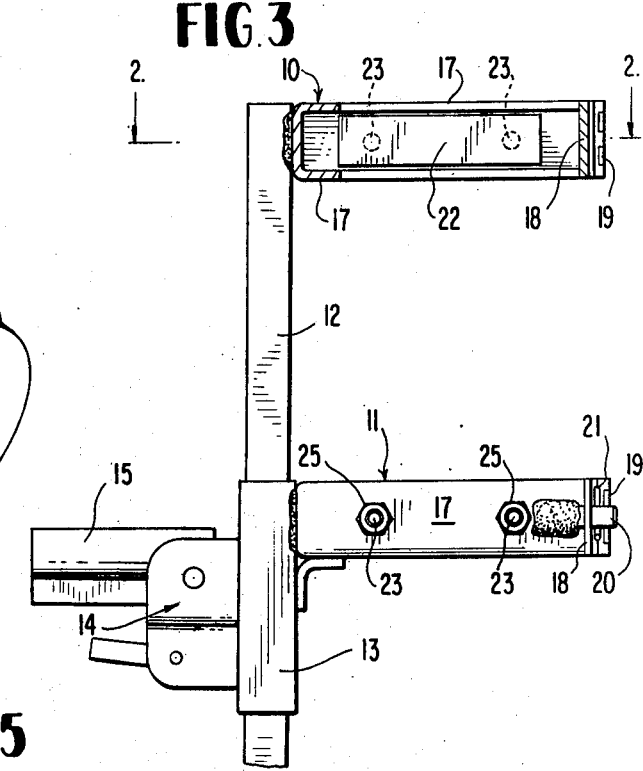
FIG.4    FIG.5    FIG.6
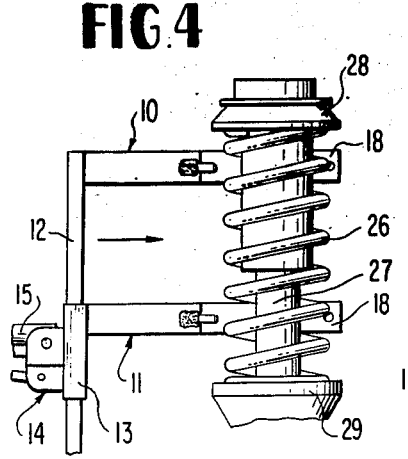
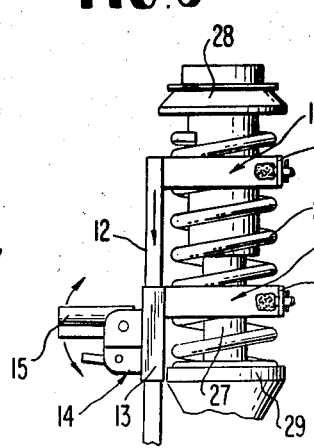
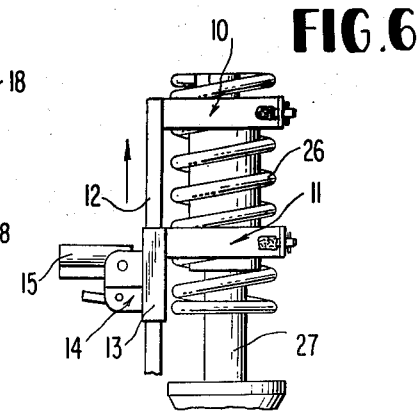

SPRING MANIPULATING DEVICE

BACKGROUND OF THE INVENTION

Certain automotive vehicles employ shock absorbers which include a strut extending from the wheel axle to an attachment point in the top of the wheel well. The strut is surrounded by a strong coil spring and it becomes necessary to compress this spring to relieve its tension on the strut before the top of the strut can be disconnected from the wheel well mounting to allow servicing or replacement of the shock absorber. In practice, various crude arrangements have been devised by mechanics for compressing the strong coil spring, and if the compressing device is not secure or the spring is released suddenly while under tension, it can become a very lethal element endangering the life of the mechanic and/or surrounding personnel or property.

The patented prior art discloses various devices for compressing or otherwise manipulating springs, in some cases relating to springs employed with shock absorbers. Some examples of the patented prior art are U.S. Pat. Nos. 2,948,057; 3,178,808 and 3,814,382.

In spite of the prior art proposals, a definite need still exists for a safer, simpler and more efficient spring manipulating device which can be manufactured at reasonable cost and which is extremely sturdy and durable. Most of the known prior art devices for similar applications tend to be more complex and costly on a comparative basis with the present invention. Additionally, some prior art devices include attachment parts which can easily become separated from other components, misplaced or lost. The present invention is embodied in a device of unit construction and the only separable parts are some spacer plates which are normally secured by threaded means at the interiors of spring coil engaging frames. In general, the invention is an improvement over the known prior art in terms of simplicity, ease and efficiency of operation, safety and economy.

SUMMARY OF THE INVENTION

A first spring coil engaging frame of channel cross section with three closed sides and an open side provided with a hinged closure bar is fixed to a standard which is movably engaged with the carriage sleeve of a conventional jacking mechanism. A second coil engaging frame identical to the first frame is fixed to the carriage sleeve whereby relative movement of the two frames along the axis of the standard can be caused by operation of the jacking mechanism. A spring compressed by the device will be safely held in the compressed condition to allow removal of the spring from a shock absorber strut and safe replacement after servicing of the shock absorber.

BRIEF DESCRIPTION OF THE DRAWINGS

FIG. 1 is a perspective view of the invention illustrating its construction and mode of use.

FIG. 2 is a horizontal section taken along line 2—2 of FIG. 3.

FIG. 3 is a side elevational view of the invention partly in cross section.

FIGS. 4, 5 and 6 are partly diagrammatic side elevations of the invention illustrating the steps involved in the usage of the device for compressing and removing a coil spring associated with a vehicle shock absorber.

DETAILED DESCRIPTION

Referring to the drawings in detail wherein like numerals designate like parts, the device embodying the invention comprises an upper or first spring coil engaging frame 10 and a cooperating second coil engaging frame 11 constructed identically to the first frame 10. The frame 10 is welded or otherwise rigidly secured to a standard 12 at one end thereof and the frame 11 is similarly rigidly secured to one end portion of a comparatively short carriage sleeve 13 of a conventional jack mechanism 14 having a pivoted operating lever 15 whose manipulation causes the carriage sleeve 13 to traverse the standard 12 in one direction or, if the carriage sleeve 13 is held, causes the standard to move longitudinally in one direction relative to the carriage sleeve. In either case, relative movement between the two frames 10 and 11 is achieved along the axis of the standard 12. The jack mechanism 14 may be of a type commonly employed as an automobile bumper jack and, being conventional, need not be further described. As illustrated in FIG. 1, the jack operating lever 15 customarily receives an extension handle 16 for increased leverage during the operation of the device.

The twin coacting coil engaging frames 10 and 11 are key features of the invention. Each frame is approximately square as viewed from one end of the standard 12 and includes three equal length side members 17 which are integrally joined at right angles, FIG. 2, the third side of each frame away from the standard 12 being open. Each frame side 17 is of channel formation in cross section, as best shown in FIG. 3, whereby a spring coil may enter the open side of the frame 10 or 11 and be slid toward the rear wall 17 of the frame and held captive securely in the three-sided channel passage provided in the frame.

The normally open side of each frame 10 and 11 is provided with a safety closure plate 18 hinged at 19 to the forward end of one frame side 17 and being apertured near its opposite end to engage over a locking pin 20 welded to the outside of the adjacent frame side 17 remote from the hinge 19. The hinged plate 19 is releasably locked to the pin 20 by a cotter key 21 or the like. The plate 18 safely retains the engaged spring coil within the channel cross section frame 10 or 11 so that it cannot possibly escape during the use of the device.

To accommodate coil springs of differing wire size and outside diameters, internal flat spacer bars 22 of varying thickness, as required, are provided for the opposite sides of each frame 10 and 11. Each spacer bar 22 carries a pair of spaced outwardly projecting threaded studs 23 which project through openings 24 in the adjacent frame sides 17 and receive securing nuts 25 at the outer sides of the frame, as illustrated.

An important usage or application of the invention is in connection with the manipulation of a strong coil spring 26 which surrounds an automotive shock absorber strut 27 and must be compressed to relieve spring tension before the top of the shock absorber can be detached from the vehicle structure, usually in the top of a wheel well, not shown. From the standpoint of safety, the device must securely retain the spring 26 in the compressed state during its removal from the strut after the strut is disconnected from its top mounting and until such time as the spring is reinstalled. There must be no chance for the compressed spring to fly loose from the strut or from the spring holding device as this could be exceedingly dangerous.

Referring particularly to FIGS. 4 through 6, the mode of use of the invention is illustrated. In FIG. 4, the spring is mounted in the normal manner in surrounding relationship to a shock absorber and is compressed between upper and lower shoulder elements 28 and 29. The two coil engaging frames 10 and 11 are adjusted in properly spaced relation to receive the two spaced spring coils and the hinged closure or retainer plates 18 are open so that the open sides of the frames 10 and 11 can receive the spring coils as the device is moved in the direction of the arrow.

FIG. 5 shows the invention engaged with the spring 26 and the retainer plates 18 are closed and locked so that the engaged spring coils are securely held captive and cannot escape from the channel passages of the frames 10 and 11.

The operating lever 15 is now utilized to draw the standard 12 and upper frame 10 downwardly relative to the frame 11 thus compressing the spring 26 and relieving spring pressure on the upper head 28. This allows the strut of the shock absorber to be detached from its upper mounting and the head 28 may be removed.

FIG. 6 shows the invention in the same holding and spring compressing position illustrated in FIG. 5, but in the absence of the head 28, the spring 26 can be safely removed endwise from the strut with the invention attached, so that the shock absorber can be worked upon or replaced. The spring 26 with the invention still attached and continuing to hold the spring compressed can be simply laid aside as a unit on a floor or workbench until such time as the spring is reapplied over the top of the strut and the strut is reconnected to the vehicle structure. At this point, the frames 10 and 11 are allowed to move apart by operation of the jack mechanism 14 and the invention is separated from the spring after the spring is returned to its normal use condition of FIG. 4.

In view of the foregoing, the safety, simplicity, strength and economy of the invention compared to the known prior art should be understood and appreciated by those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A spring manipulating device comprising a standard, a jack mechanism connected with the standard for movement relative to the standard, a first spring retaining frame fixed to the standard, and a second spring retaining frame fixed to the jack mechanism, each frame being of rectangular form and having one open side and each frame defining a channel passage around three sides thereof adapted to receive a spring coil, and a closure plate for the open side of each frame adapted to cover said open side and retain the spring coil engaged with the frame.

2. A spring manipulating device as defined in claim 1, and said jack mechanism including a carriage sleeve through which said standard is engaged, said second frame fixed to said carriage sleeve.

3. A spring manipulating device as defined in claim 1, and the closure plate for the open side of each frame being hingedly connected to the frame, and means to releasably lock the closure plate in covering relationship to said open side of the frame.

4. A spring manipulating device as defined in claim 3, and said means comprising a projecting pin element on one side of the frame, said closure pin being apertured near its end away from its hinged connection to receive the pin element releasably.

5. A spring manipulating device as defined in claim 1, and at least one spacer bar insertable into the channel passage of each spring retaining frame to reduce the internal width of the frame and thereby adapt the frame to a smaller sized spring.

6. A spring manipulating device as defined in claim 1, and a pair of spacer bars for each frame insertable into the channel passage of the frame at opposite sides of the frame to reduce the effective interior width of the frame in order to adapt the frame to a smaller spring size.

7. A spring manipulating device as defined in claim 6, and at least one threaded stud on each spacer bar projecting beyond one side only thereof, the adjacent frame side being apertured to receive said stud, and a nut secured to the stud at the exterior of the frame side.

* * * * *